(12) United States Patent
Lee

(10) Patent No.: US 12,495,198 B2
(45) Date of Patent: Dec. 9, 2025

(54) CAMERA MODULE

(71) Applicant: SAMSUNG ELECTRO-MECHANICS CO., LTD., Suwon-si (KR)

(72) Inventor: Kangjin Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 119 days.

(21) Appl. No.: 18/504,589

(22) Filed: Nov. 8, 2023

(65) Prior Publication Data

US 2024/0236461 A1 Jul. 11, 2024

(30) Foreign Application Priority Data

Jan. 9, 2023 (KR) .................. 10-2023-0002764
May 23, 2023 (KR) .................. 10-2023-0066401

(51) Int. Cl.
*H04N 23/55* (2023.01)
*G03B 17/02* (2021.01)
*H04N 23/51* (2023.01)

(52) U.S. Cl.
CPC ............. *H04N 23/55* (2023.01); *G03B 17/02* (2013.01); *H04N 23/51* (2023.01)

(58) Field of Classification Search
CPC ........ H04N 23/55; H04N 23/51; H04N 23/57; H04N 23/54; H04N 23/50; G03B 17/02; G03B 17/12; G03B 17/17; G02B 7/021
See application file for complete search history.

(56) References Cited

U.S. PATENT DOCUMENTS 12,143,699 B2 * 11/2024 Owaki .................. G01D 11/30
2016/0088198 A1 * 3/2016 An ....................... H04N 23/51
348/374

(Continued)

FOREIGN PATENT DOCUMENTS

JP        2018-169500 A    11/2018
KR   10-2017-0027073 A     3/2017

(Continued)

OTHER PUBLICATIONS

Korean Office Action issued Oct. 28, 2024, in counterpart Korean Patent Application No. 10-2023-0066401 (7 pages in English, 7 pages in Korean).

*Primary Examiner* — Kelly L Jerabek
(74) *Attorney, Agent, or Firm* — NSIP Law

(57) ABSTRACT

A camera module includes a cover; a housing having an inner space covered by the cover; a folded module including a reflective member reflecting incident light; a lens module including a plurality of lenses transferring, in a direction of an optical axis, light reflected from the reflective member through the inner space of the housing; an image sensor module including an image sensor sensing light transferred through the lens module, and a sensor circuit board having a first surface on which the image sensor is mounted; and an external circuit connection portion configured to connect to a connection edge of the sensor circuit board and extend outside the housing to be connectable to an external circuit. The connection edge includes a first edge portion disposed between imaginary surfaces extending from the opposing outer surfaces of the cover, and a second edge portion protruding farther outward than the first edge portion.

18 Claims, 6 Drawing Sheets

(56) References Cited

U.S. PATENT DOCUMENTS

| | | | |
|---|---|---|---|
| 2016/0119545 A1* | 4/2016 | Shimizu | G02B 7/08 |
| | | | 348/208.13 |
| 2016/0142599 A1* | 5/2016 | Shimizu | G03B 5/00 |
| | | | 348/374 |
| 2018/0255213 A1 | 9/2018 | Ahn et al. | |
| 2018/0284476 A1 | 10/2018 | Minamisawa | |
| 2020/0137274 A1* | 4/2020 | Lee | G03B 17/17 |
| 2021/0227109 A1 | 7/2021 | Jung et al. | |
| 2021/0258459 A1 | 8/2021 | Zhang | |
| 2021/0294184 A1* | 9/2021 | Kim | G03B 17/17 |
| 2022/0066291 A1* | 3/2022 | Hong | G02B 27/646 |
| 2024/0004268 A1* | 1/2024 | Kim | G03B 17/12 |
| 2024/0214681 A1* | 6/2024 | Xia | H04N 23/54 |

FOREIGN PATENT DOCUMENTS

| | | |
|---|---|---|
| KR | 10-2022-0058508 A | 5/2022 |
| KR | 10-2022-0127025 A | 9/2022 |

* cited by examiner

CAMERA MODULE

CROSS-REFERENCE TO RELATED APPLICATION

This application claims the benefit under 35 USC § 119(a) of Korean Patent Application No. 10-2023-0002764 filed in the Korean Intellectual Property Office on Jan. 9, 2023, and Korean Patent Application No. 10-2023-0066401 filed in the Korean Intellectual Property Office on May 23, 2023, the entire disclosures of which are incorporated herein by reference for all purposes.

BACKGROUND

1. Field

The present disclosure relates to a camera module.

2. Description of the Background

A camera module may be used in a portable electronic device such as a smartphone, a tablet personal computer (PC), a laptop computer, or the like, and its application range is gradually expanding. As the portable electronic device is down-sized and thinned according to a market demand, the camera module may also be down-sized and thinned.

In addition to a demand for downsizing and thinning of the camera module, it may be desired to improve performance of the camera module. To this end, an auto focus function, a zoom function, a hand shake correction function, and the like are added in the camera module, but there is a limit to downsizing and thinning of the camera module based on an existing structure.

In order to solve this problem, a camera module having a folded module that aligns a plurality of lenses in a longitudinal or width direction, instead of a thickness direction of the portable electronic device, and changes a path of incident light using a reflective member may be desired.

When a flexible printed circuit board (FPCB) connected to an existing folded camera module is bent, a rounded portion may protrude out of the module region. To protect this, a bracket may be mounted at the folded camera module. However, when the rounded portion of the flexible printed circuit board protrudes out of the module region, a problem in which the size of an entire camera module increases due to an increase in the size of the bracket may occur.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspect, a camera module includes a cover having opposing outer surfaces; a housing having an inner space covered by the cover; a folded module including a reflective member reflecting incident light; a lens module including a plurality of lenses transferring, in a direction of an optical axis, light reflected from the reflective member through the inner space of the housing; an image sensor module including an image sensor sensing light transferred through the lens module, and a sensor circuit board having a first surface on which the image sensor is mounted; and an external circuit connection portion configured to connect to a connection edge of the sensor circuit board and extend outside the housing to be connectable to an external circuit. The connection edge includes a first edge portion disposed between imaginary surfaces extending from the opposing outer surfaces of the cover, and a second edge portion protruding farther outward than the first edge portion.

The first edge portion may be disposed by being retreated inward from an imaginary surface of the imaginary surfaces to which one outer surface of the cover extends to an inner side where the optical axis is disposed, and the second edge portion may be disposed to contact another imaginary surface of the imaginary surfaces to which the one outer surface of the cover extends.

The camera module may further include a first reinforcing plate disposed on a second surface, opposing the first surface, of the sensor circuit board. The first reinforcing plate may include a third edge portion and a fourth edge portion corresponding to the first edge portion and the second edge portion, respectively, of the sensor circuit board. The third edge portion may be disposed between the imaginary surfaces, and the fourth edge portion may protrude outward farther than the third edge portion.

The external circuit connection portion may further include a flexible circuit board having one end connected to the connection edge of the sensor circuit board, and a connection circuit board connected to another end of the flexible circuit board. The flexible circuit board may be connected and disposed at the first edge portion of the sensor circuit board.

The flexible circuit board may be bent and disposed between the imaginary surfaces, and the connection circuit board may be seated on an outer surface of the first reinforcing plate.

The flexible circuit board may not protrude beyond the imaginary surfaces.

The connection circuit board may not protrude beyond the imaginary surfaces.

The camera module may further include a second reinforcing plate attached to one surface of the connection circuit board. The second reinforcing plate may be disposed between the first reinforcing plate and the connection circuit board.

A planar area of the connection circuit board may be smaller than a planar area of the sensor circuit board.

The camera module may further include a connector portion connected to the external circuit connection portion. The connector portion may include a connector connection circuit having one end connected to one edge of the connection circuit board, a connector board connected to another end of the connector connection circuit, and a connector disposed on the connector board.

The connector portion may be disposed between the imaginary surfaces.

The first edge portion and the second edge portion may be parallel to each other and extend in a light incidence direction.

In another general aspect, a camera module includes a cover having opposing outer surfaces; a housing having an inner space covered by the cover; a folded module including a reflective member reflecting incident light; a lens module including a plurality of lenses transferring, in a direction of an optical axis, light reflected from the reflective member through the inner space of the housing; an image sensor module including an image sensor sensing light transferred through the lens module, and a sensor circuit board having a first surface on which the image sensor is mounted; and an external circuit connection portion configured to connect to a connection edge of the sensor circuit board and extend outside the housing to be connectable to an external circuit. The connection edge includes a first edge portion that is disposed by being retreated inward from an imaginary surface to which one outer surface of the cover extends to an inner side where the optical axis is disposed, and a second edge portion that is disposed to contact the imaginary surface.

The external circuit connection portion may further include a flexible circuit board having one end connected to the connection edge of the sensor circuit board, and a connection circuit board connected to another end of the flexible circuit board. The flexible circuit board may be connected and disposed at the first edge portion of the sensor circuit board.

The flexible circuit board may not protrude beyond imaginary surfaces extending from the opposing outer surfaces of the cover.

The first edge portion and the second edge portion may be parallel to each other and extend in a light incidence direction.

In another general aspect, a camera module includes a cover having opposing outer surfaces; a housing having an inner space covered by the cover; a folded module including a reflective member reflecting incident light incident; a lens module including a plurality of lenses transferring, in a direction of an optical axis, light reflected from the reflective member through the inner space of the housing; an image sensor module including an image sensor sensing light transferred through the lens module, and a sensor circuit board having a first surface on which the image sensor is mounted; and an external circuit connection portion configured to connect to a connection edge of the sensor circuit board and extend outside the housing to be connectable to an external circuit. The connection edge of the sensor circuit board is disposed between imaginary surfaces extending from the opposing outer surfaces.

The external circuit connection portion may further include a flexible circuit board having one end connected to the connection edge of the sensor circuit board, and the flexible circuit board may be bent and disposed between the imaginary surfaces.

The connection edge of the sensor circuit board and the flexible circuit board may be disposed not protrude beyond the imaginary surfaces.

Other features and aspects will be apparent from the following detailed description, the drawings, and the claims.

Figure 1:
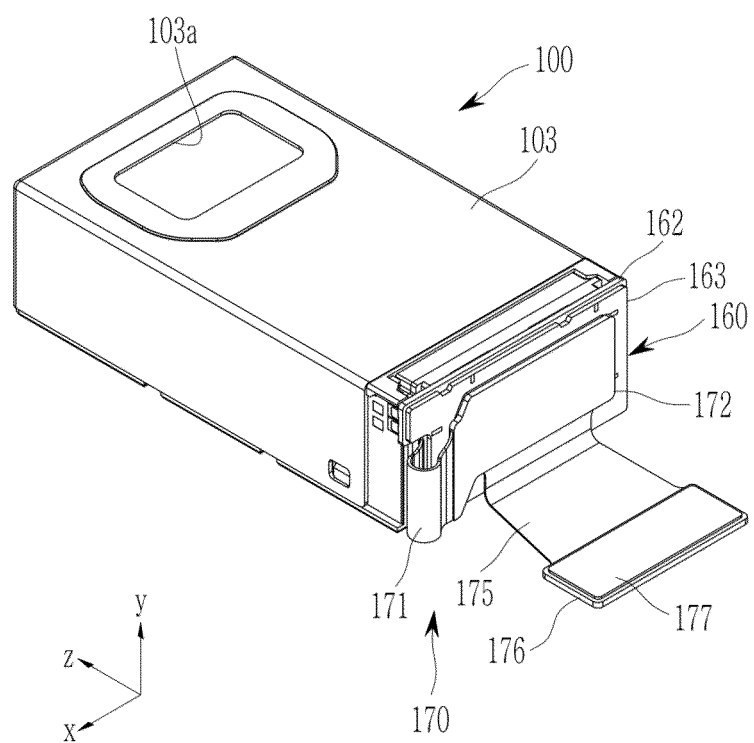
FIG. 1 is a perspective view showing an appearance of an example of a camera module according to an embodiment.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Due to manufacturing techniques and/or tolerances, variations of the shapes shown in the drawings may occur. Thus, the examples described herein are not limited to the specific shapes shown in the drawings, but include changes in shape that occur during manufacturing.

Unless otherwise defined, all terms, including technical and scientific terms, used herein have the same meaning as commonly understood by one of ordinary skill in the art to which this disclosure pertains specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

Figure 2:
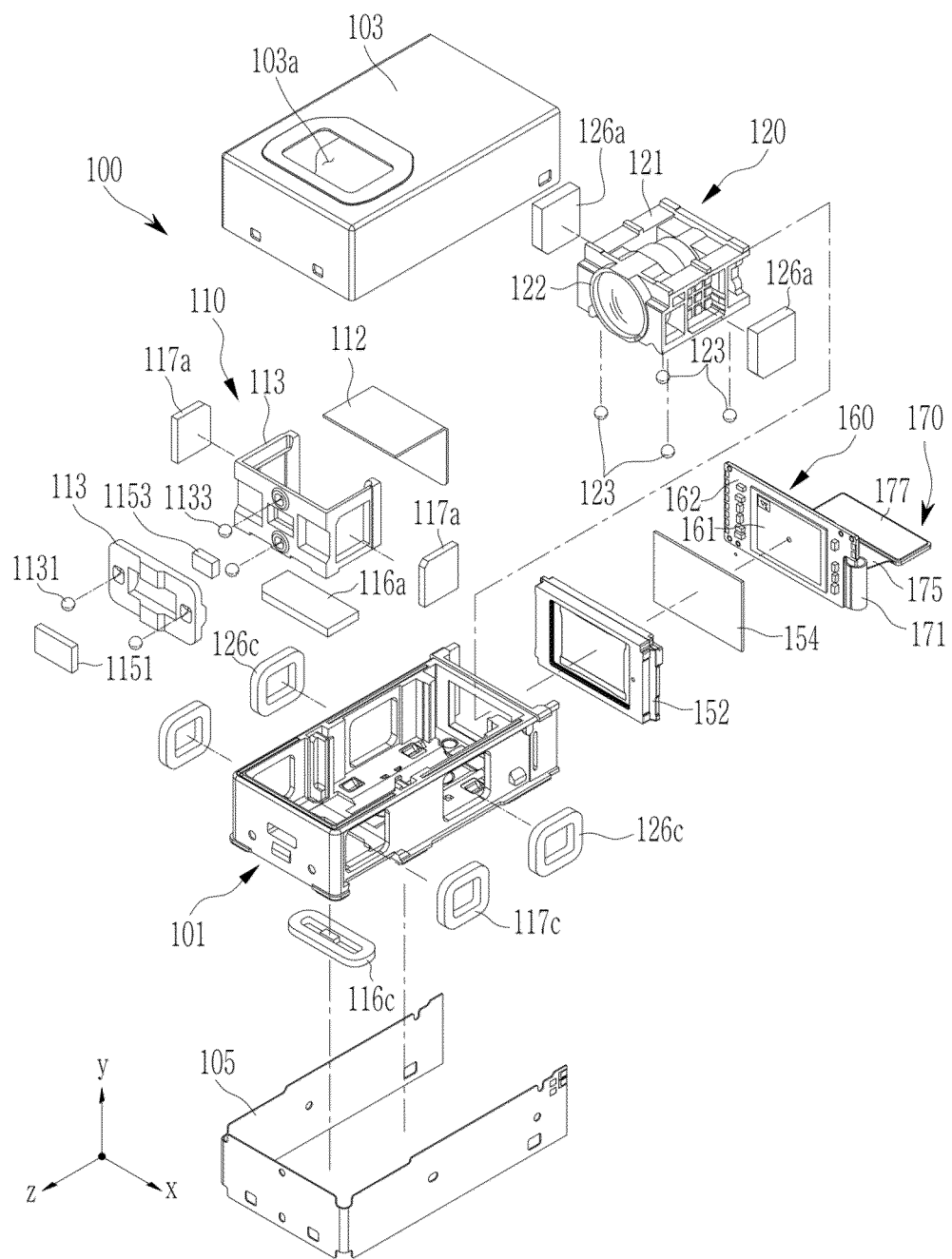
FIG. 2 is an exploded perspective view illustrating the camera module shown in FIG. 1.

FIG. 1 is a perspective view showing an appearance of a camera module according to an embodiment, and FIG. 2 is an exploded perspective view illustrating the camera module shown in FIG. 1.

Referring to FIG. 1 and FIG. 2, the camera module 100 according to the present embodiment may include a folded module 110, a lens module 120, and an image sensor module 160. The folded module 110 and the lens module 120 are accommodated in an inner space of a housing 101. A cover 103 partially surrounds an upper portion and a side surface of the housing 101, and partially constitutes an appearance of the camera module 100. Here, the cover 103 may be a shield can made of a metal.

The folded module 110 may be configured to change a path of incident light coming from the outside. Incident light entering the inside of a camera through an opening 103a of the cover 103 may be reflected toward the lens module 120 by the folded module 110. In the present embodiment, the folded module 110 may include a reflective member 112. In one or more examples, the reflective member 112 may be provided in the form of a prism or a mirror.

The lens module 120 includes a carrier 121 movably provided in an inner space of the housing 101 in a direction of an optical axis (a z-axis of the drawings), and a lens barrel 122 fixed to the carrier 121 and including at least one lens therein. Light reflected from the folded module 110 is refracted while passing through the lens module 120. Light passing through the lens module 120 is incident on an image sensor 161. When the lens module includes a plurality of lenses, the plurality of lenses may be disposed in the direction of the optical axis.

The camera module 100 according to the present embodiment may provide an auto focus (AF) function and an optical image stabilization (OIS) function. Hereinafter, structures of an AF driving portion and an OIS driving portion implementing the AF function and the OIS function will be described with reference to the drawings. However, the AF function and the OIS function may be implemented with the AF driving portion and the OIS driving portion having various known structures, and the present disclosure does not need to be limited thereto.

The lens module 120 may adjust a focal length or may implement a zoom function while reciprocating along the optical axis. The AF driving portion may be disposed at a side portion of the lens module 120. In the present embodiment, an AF magnet 126a may be mounted at the lens module 120, and an AF coil 126c may be disposed at a position facing the AF magnet 126a. The lens module 120 may move along the optical axis by electromagnetic interaction between the AF coil 126c and the AF magnet 126a. The AF coil 126c may be mounted at a circuit board 105 attached to the housing 101, and the housing 101 may have an opening through which the AF coil 126c and the AF magnet 126a face each other.

Ball members 123 may be disposed between the lens module 120 and a bottom surface of the housing 101 for a smooth operation. The lens module 120 and the bottom surface of the housing 101 may include guide grooves that partially accommodate the ball members 123. The guide grooves extend in a direction parallel to the optical axis, and a direction of motion of the ball members 123 is limited to an extension direction (i.e., the direction of the optical axis) of the guide groove.

The OIS function may be implemented by rotating the folded module 110 about an axis perpendicular to the optical axis. For example, when the optical axis is referred to as a first axis, the first axis may be parallel to the z-axis of the drawings, a second axis that is an axis perpendicular to the optical axis and parallel to incident light may be parallel to a y-axis of the drawings, and a third axis that is perpendicular to the optical axis and the second axis may be parallel to an x-axis of the drawings.

The folded module 110 may include the OIS driving portion configured to rotate the reflective member 112 about the second axis and the third axis perpendicular to the optical axis with respect to the housing 101. The OIS driving portion may include a first OIS driving portion configured to rotate the reflective member 112 about the second axis (or the y-axis) perpendicular to the optical axis, and a second OIS driving portion configured to rotate the reflective member 112 about the third axis (or the x-axis) perpendicular to the optical axis and orthogonal to the second axis.

The OIS driving portion may rotate the reflection member 112 about the second axis and/or the third axis so that shaking of an image formed at the image sensor 161 due to shaking of the camera module 100 is optically corrected.

The first OIS driving portion may be disposed at both sides of a moving holder 113. The first OIS driving portion may include a first OIS magnet 117a mounted at both sides of the moving holder 113 and a first OIS coil 117c disposed to face the first OIS magnet 117a. The first OIS coil 117c may be fixedly coupled to the housing 101, and due to electromagnetic interaction between the first OIS coil 117c and the first OIS magnet 117a, the moving holder 113 may rotate about the second axis (or the y-axis) perpendicular to the optical axis with respect to the housing 101.

In addition, the second OIS driving portion may be disposed below the moving holder 113. The second OIS driving portion may include a second OIS magnet 116a mounted at a bottom of the moving holder 113 and a second OIS coil 116c disposed to face the second OIS magnet 116a. The second OIS coil 116c may be fixedly coupled to the housing 101, and by electromagnetic interaction between the second OIS coil 116c and the second OIS magnet 116a, the moving holder 113 may rotate about the third axis (or the x-axis) perpendicular to the optical axis with respect to the housing 101.

The first OIS coil 117c and the second OIS coil 116c are attached to the circuit board 105, and the circuit board 105 is fixed to the housing 101. The housing 101 may include openings configured to expose the first OIS coil 117c and the second OIS coil 116c to the inside of the housing 101.

On the other hand, the image sensor module 160 may include the image sensor 161 and a sensor circuit board 162 on which the image sensor 161 is mounted. An image may be formed on an image surface (or an upper surface) of the image sensor 161, and in response to the image, the image sensor 161 may generate an image signal for the image, and the image signal may be transferred to an external circuit through the sensor circuit board 162. The image sensor module 160 may be fixed to a rear surface of the housing 101 through a base frame 152, and an infrared filter 154 may be interposed between the base frame 152 and the image sensor 161.

The image sensor module 160 may be connected to an external circuit connection portion 170 extending outside the housing 101 for connection to the external circuit or the like. The external circuit connection portion 170 may include a flexible circuit board 171 having one end connected to a connection edge of the sensor circuit board 162 and a connection circuit board 172 connected to the other end of the flexible circuit board 171. The flexible circuit board 171 may be made of a flexible printed circuit board (FPCB), and the connection circuit board 172 may be made of a rigid printed circuit board.

Hereinafter, a configuration and an attachment structure of the external circuit connection portion of the camera module 100 according to the present embodiment will be described in more detail with reference to FIG. 3 and FIG. 4.

Figure 3:
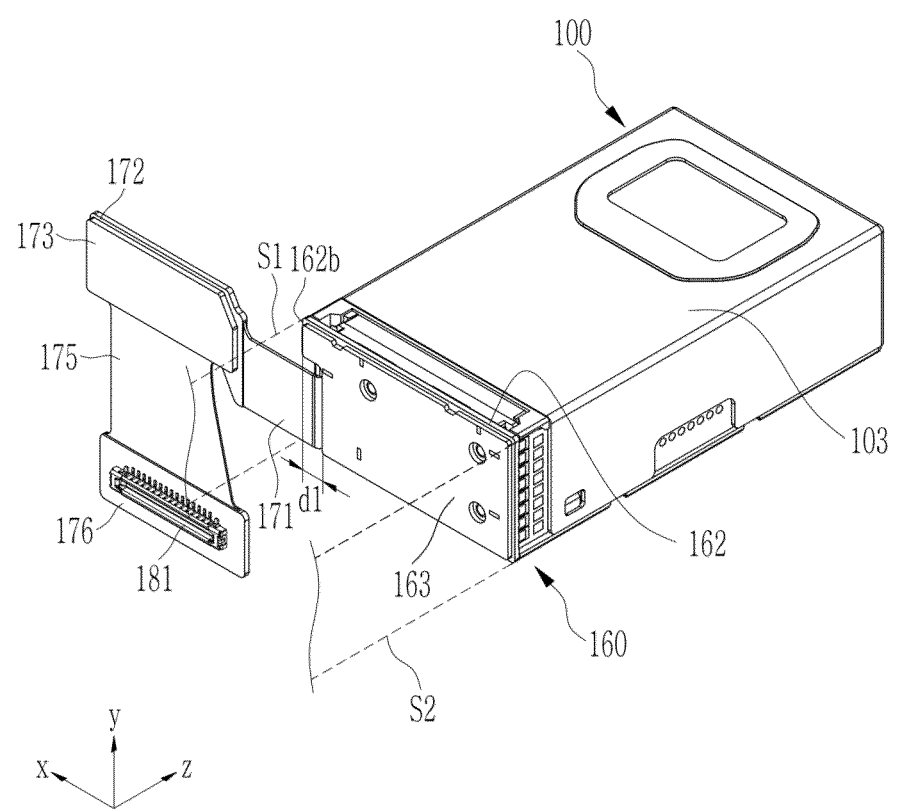
FIG. 3 is a perspective view illustrating an unfolded external circuit connection portion of the camera module shown in FIG. 1.
Figure 4:
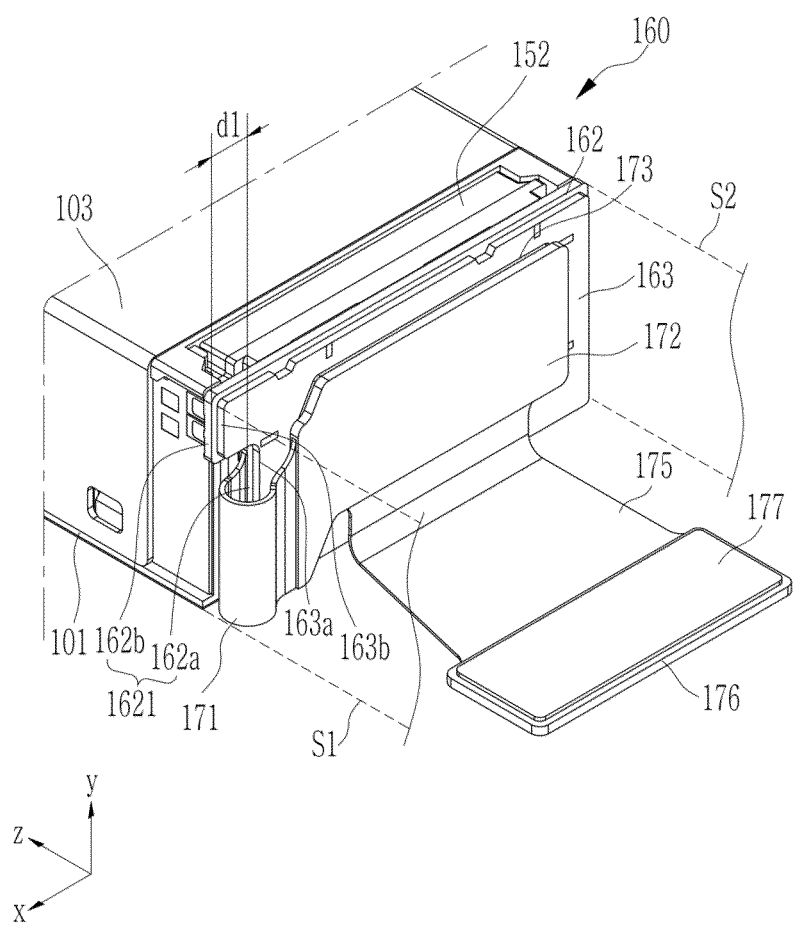
FIG. 4 is a partial perspective view illustrating a state in which a flexible circuit board of the external circuit connection portion of the camera module shown in FIG. 1 is bent.

FIG. 3 is a perspective view illustrating an unfolded external circuit connection portion of the camera module shown in FIG. 1, and FIG. 4 is a partial perspective view illustrating a state in which the flexible circuit board of the external circuit connection portion of the camera module shown in FIG. 1 is bent.

Referring to FIG. 3, the sensor circuit board 162 according to the present embodiment includes the connection edge 1621 having one side edge to which the flexible circuit board 171 is connected. The connection edge 1621 of the sensor circuit board 162 includes a first edge portion 162a from which the flexible circuit board 171 is drawn out and a second edge portion 162b protruding outward more than the first edge portion 162a. In this case, the first edge portion 162a may be disposed between imaginary surfaces S1 and S2 extending from a pair of opposite outer surfaces of the cover 103. The first edge portion 162a and the second edge portion 162b may be parallel to each other, and may extend in a light incidence direction (a direction of the y-axis of the drawings).

In addition, the first edge portion 162a may be disposed by being retreated inward by a depth d1 from the imaginary surface S1 to which one outer surface of the cover 103 extends to an inner side where the optical axis is disposed or the imaginary plane S2 to which the other outer surface of the cover 103 extends. The second edge portion 162b may protrude outward more than the first edge portion 162a so that the second edge portion 162b contacts the imaginary surface S1 to which the outer surface of the cover 103 extends. The depth d1 at which the first edge portion 162a is retreated may be determined in consideration of a degree to which the flexible circuit board 171 protrudes while being bent. That is, even if the flexible circuit board 171 protrudes from the first edge portion 162a while being bent, the flexible circuit board 171 may be designed so that it does not protrude outward more than the outer surface of the cover 103 (or the imaginary surface to which the outer surface extends).

A rear shape of the housing 101 to which the base frame 152 of FIG. 2 is coupled may have a rectangular shape. In this case, the sensor circuit board 162 may have an approximately rectangular shape corresponding to the shape of the rear shape of the housing 101, and the first edge portion 162a may be formed by partially cutting the connection edge 1621.

A first reinforcing plate 163 may be attached to the outside of the sensor circuit board 162. The first reinforcing plate 163 may have a shape corresponding to a planar shape of the sensor circuit board 162. Accordingly, the first reinforcing plate 163 includes a third edge portion 163a and a fourth edge portion 163b respectively corresponding to the first edge portion 162a and the second edge portion 162b of the sensor circuit board 162. In this case, the third edge portion 163a may be disposed between the imaginary surfaces S1 and S2 extending from the pair of the outer surfaces of the cover 103, and the fourth edge portion 163b may protrude outward more than the third edge portion 163a. Overall, a planar area of the first reinforcing plate 163 may be smaller than a planar area of the sensor circuit board 162.

Referring to FIG. 4, the flexible circuit board 171 may be bent so that the flexible circuit board 171 is disposed between the imaginary surfaces S1 and S2 extending from the pair of the outer surfaces of the cover 103, and the connection circuit board 172 may be seated on an outer surface of the first reinforcing plate 163. A second reinforcing plate 173 may be attached to one surface of the connection circuit board 172, and the second reinforcing plate 173 may be disposed between the first reinforcing plate 163 and the connection circuit board 172. A planar area of the connection circuit board 172 may be smaller than a planar area of the sensor circuit board 162.

The external circuit connection portion 170 may include a connector portion. The connector portion includes a connector connection circuit 175 having one end connected to one edge of the connection circuit board 172, a connector board 176 connected to the other end of the connector connection circuit 175, and a connector 181 mounted at the connector board 176. A third reinforcing plate 177 may be attached to one surface of the connector board 176. One edge of the connection circuit board 172 to which the connector connection circuit 175 is connected may be an edge adjacent to an edge to which the flexible circuit board 171 is connected. The connector connection circuit 175 may be a flexible printed circuit board.

Figure 5:
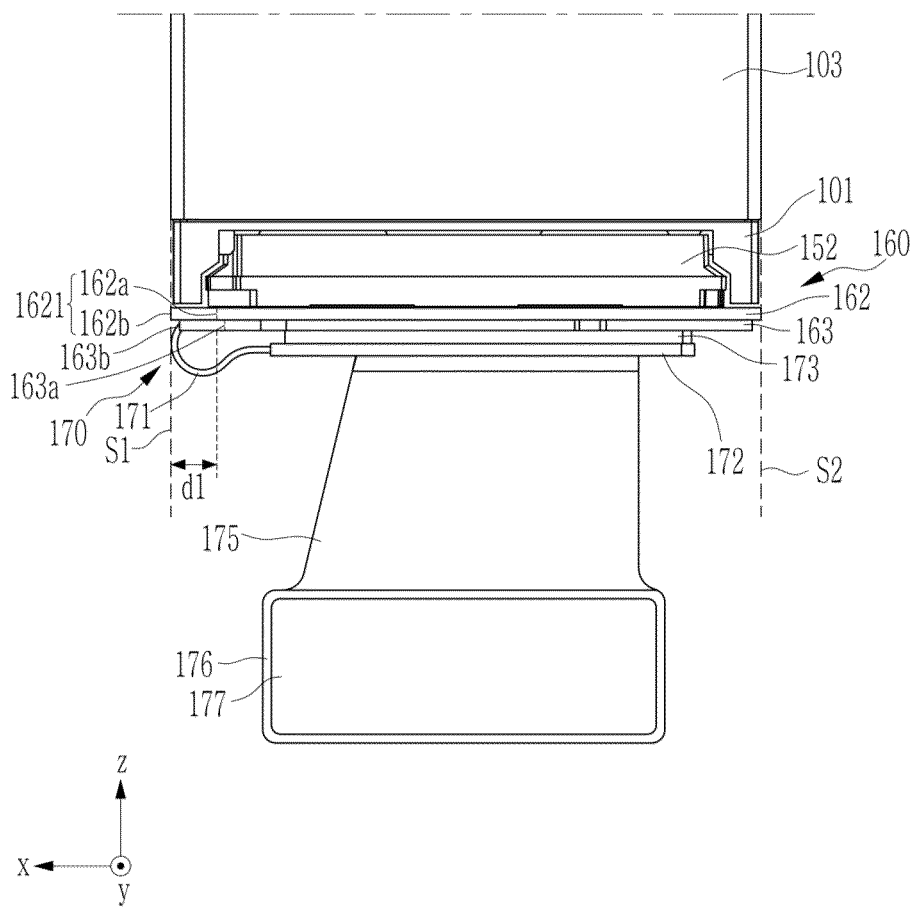
FIG. 5 is a partial plan view illustrating the external circuit connection portion of the camera module shown in FIG. 1.

FIG. 5 is a partial plan view illustrating the external circuit connection portion of the camera module shown in FIG. 1.

Referring to FIG. 5, the external circuit connection portion 170 may be disposed between the imaginary surfaces S1 and S2 extending from the pair of the opposite outer surfaces of the cover 103. The sensor circuit board 162 may have the first edge portion 162*a* retreated inward from the imaginary surface S1, and the flexible circuit board 171 may be connected to the first edge portion 162*a* to be bent. Therefore, the flexible circuit board 171 may not protrude outside the pair of the opposite outer surfaces of the cover 103 or the imaginary surfaces S1 and S2 extending from the pair of the opposite outer surfaces of the cover 103.

In addition, the connection circuit board 172 connected to the flexible circuit board 171 may have a smaller planar area than that of the sensor circuit board 162, and may be seated on the first reinforcing plate 163 attached to the sensor circuit board 162. Therefore, the connection circuit board 172 may not protrude outside the pair of the opposite outer surfaces of the cover 103 or the imaginary surfaces S1 and S2 extending from the pair of the opposite outer surfaces of the cover 103.

The connector connection circuit 175 connected to one edge of the connection circuit board 172 may be disposed between the imaginary surfaces S1 and S2 extending from the pair of the opposite outer surfaces of the cover 103. In addition, the connector connection circuit 175 may be a flexible printed circuit board, and therefore, the connector board 176 and the connector 181 connected to the connector connection circuit 175 may also be disposed between the imaginary surfaces S1 and S2 extending from the pair of the opposite outer surfaces of the cover 103.

Figure 6:
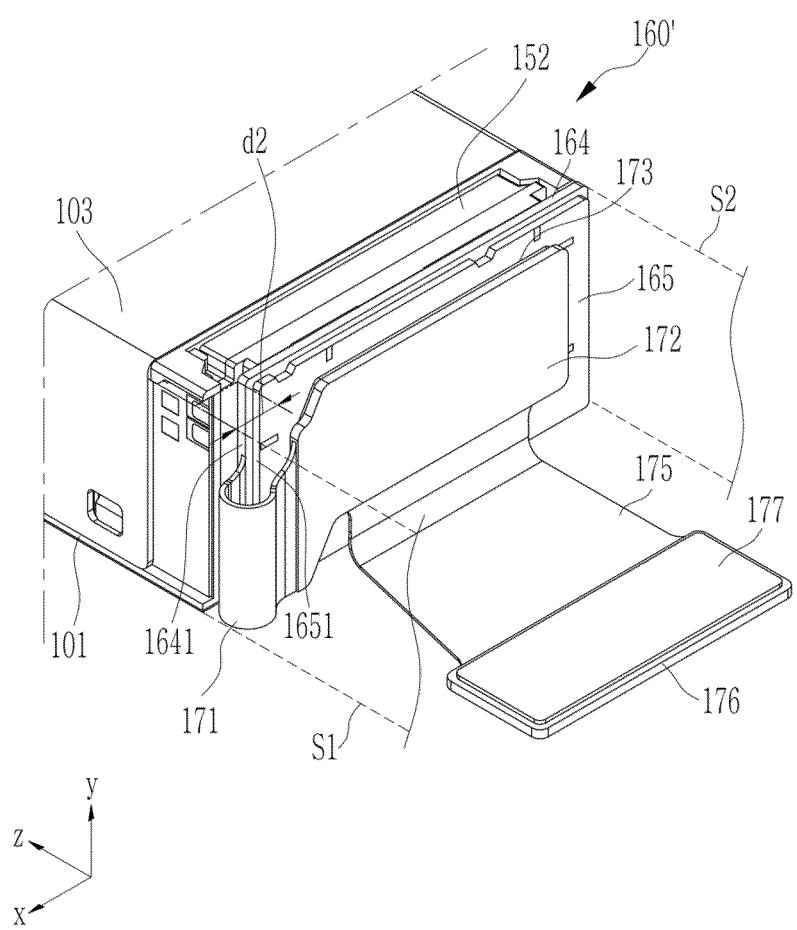
FIG. 6 is a partial perspective view showing a state in which a flexible circuit board of an external circuit connection portion of a camera module is bent according to another embodiment.

FIG. 6 is a partial perspective view showing a state in which a flexible circuit board of an external circuit connection portion of a camera module is bent according to another embodiment.

Referring to FIG. 6, in an image sensor module 160' according to the present embodiment, a sensor circuit board 164 includes a connection edge 1641 having one side edge to which the flexible circuit board 171 is connected. In this case, the connection edge 1641 may extend in the light incidence direction (the direction of the y-axis of the drawings), and may be disposed between the imaginary surfaces S1 and S2 extending from the pair of the opposite outer surfaces of the cover 103. In addition, the connection edge 1641 of the sensor circuit board 164 may be disposed by being retreated inward by a depth d2 from the imaginary surface S1 to which one outer surface of the cover 103 extends to the inner side where the optical axis is disposed or the imaginary plane S2 to which the other outer surface of the cover 103 extends.

A first reinforcing plate 165 may be attached to the outside of the sensor circuit board 164. The first reinforcing plate 165 may have a shape corresponding to a planar shape of the sensor circuit board 164. Accordingly, the first reinforcing plate 165 includes an edge 1651 corresponding to the connection edge 1641 of the sensor circuit board 164. In this case, the edge 1651 of the first reinforcing plate 165 may also be disposed between the imaginary surfaces S1 and S2 extending from the pair of the outer surfaces of the cover 103. Overall, a planar area of the first reinforcing plate 165 may be smaller than a planar area of the sensor circuit board 164.

The flexible circuit board 171 may be bent so that the flexible circuit board 171 is disposed between the imaginary surfaces S1 and S2 extending from the pair of the outer surfaces of the cover 103, and the connection circuit board 172 may be seated on an outer surface of the first reinforcing plate 165. The second reinforcing plate 173 may be attached to one surface of the connection circuit board 172, and the second reinforcing plate 173 may be disposed between the first reinforcing plate 165 and the connection circuit board 172. A planar area of the connection circuit board 172 may be smaller than a planar area of the sensor circuit board 162.

In one or more embodiments, a camera module discloses a bending structure of a circuit board that may limit the size of a folded camera module.

In one or more embodiments, the size of a folded camera module may be reduced by improving a rigid printed circuit board for external circuit connection and a bending structure of a flexible circuit board for the external circuit connection.

A cutout portion may be formed at the rigid printed circuit board for the external circuit connection, and the flexible circuit board may be bent by the cutout portion to form a rounded portion. Accordingly, since the flexible circuit board is drawn out in a state in which it is retreated inward from an edge of the camera module, the rounded portion may be configured not to protrude outside the camera module region.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A camera module comprising:
   a cover having opposing outer surfaces;
   a housing having an inner space covered by the cover;
   a folded module comprising a reflective member reflecting incident light;
   a lens module comprising a plurality of lenses transferring, in a direction of an optical axis, light reflected from the reflective member through the inner space of the housing;
   an image sensor module comprising an image sensor sensing light transferred through the lens module, and a sensor circuit board having a first surface on which the image sensor is mounted; and
   an external circuit connection portion configured to connect to a connection edge at a side edge of the sensor circuit board and extend outside the housing to be connectable to an external circuit,
   wherein the connection edge comprises a first edge portion disposed between imaginary surfaces extending from the opposing outer surfaces of the cover, and a second edge portion protruding farther outward than the first edge portion, and wherein the first edge portion is spaced apart from an imaginary surface of the imaginary surfaces to which one outer surface of the cover extends to an inner side where the optical axis is disposed.

2. The camera module of claim 1, wherein the second edge portion is disposed to contact another imaginary surface of the imaginary surfaces to which the one outer surface of the cover extends.

3. The camera module of claim 1, further comprising a first reinforcing plate disposed on a second surface, opposing the first surface, of the sensor circuit board, wherein the first reinforcing plate comprises a third edge portion and a fourth edge portion corresponding to the first edge portion and the second edge portion, respectively, of the sensor circuit board, and the third edge portion is disposed between the imaginary surfaces, and the fourth edge portion protrudes outward farther than the third edge portion.

4. The camera module of claim 3, wherein the external circuit connection portion further includes a flexible circuit board having one end connected to the connection edge of the sensor circuit board, and a connection circuit board connected to another end of the flexible circuit board, and the flexible circuit board is connected and disposed at the first edge portion of the sensor circuit board.

5. The camera module of claim 4, wherein the flexible circuit board is bent and disposed between the imaginary surfaces, and the connection circuit board is seated on an outer surface of the first reinforcing plate.

6. The camera module of claim 5, wherein the flexible circuit board does not protrude beyond the imaginary surfaces.

7. The camera module of claim 5, wherein the connection circuit board does not protrude beyond the imaginary surfaces.

8. The camera module of claim 5, further comprising a second reinforcing plate attached to one surface of the connection circuit board, wherein the second reinforcing plate is disposed between the first reinforcing plate and the connection circuit board.

9. The camera module of claim 4, wherein a planar area of the connection circuit board is smaller than a planar area of the sensor circuit board.

10. The camera module of claim 4, further comprising a connector portion connected to the external circuit connection portion, wherein the connector portion includes a connector connection circuit having one end connected to one edge of the connection circuit board, a connector board connected to another end of the connector connection circuit, and a connector disposed on the connector board.

11. The camera module of claim 10, wherein the connector portion is disposed between the imaginary surfaces.

12. The camera module of claim 1, wherein the first edge portion and the second edge portion are parallel to each other and extend in a light incidence direction.

13. A camera module comprising:
a cover having opposing outer surfaces;
a housing having an inner space covered by the cover;
a folded module including a reflective member reflecting incident light;
a lens module comprising a plurality of lenses transferring, in a direction of an optical axis, light reflected from the reflective member through the inner space of the housing;
an image sensor module comprising an image sensor sensing light transferred through the lens module, and a sensor circuit board having a first surface on which the image sensor is mounted; and
an external circuit connection portion configured to connect to a connection edge at a side edge of the sensor circuit board and extend outside the housing to be connectable to an external circuit,
wherein the connection edge comprises a first edge portion that is disposed by being retreated inward from an imaginary surface to which one outer surface of the cover extends to an inner side where the optical axis is disposed, and a second edge portion that is disposed to contact the imaginary surface.

14. The camera module of claim 13, wherein the external circuit connection portion further includes a flexible circuit board having one end connected to the connection edge of the sensor circuit board, and a connection circuit board connected to another end of the flexible circuit board, and the flexible circuit board is connected and disposed at the first edge portion of the sensor circuit board.

15. The camera module of claim 14, wherein the flexible circuit board does not protrude beyond imaginary surfaces extending from the opposing outer surfaces of the cover.

16. The camera module of claim 13, wherein the first edge portion and the second edge portion are parallel to each other and extend in a light incidence direction.

17. A camera module comprising:
a cover having opposing outer surfaces;
a housing having an inner space covered by the cover;
a folded module including a reflective member reflecting incident light incident;
a lens module comprising a plurality of lenses transferring, in a direction of an optical axis, light reflected from the reflective member through the inner space of the housing;
an image sensor module comprising an image sensor sensing light transferred through the lens module, and a sensor circuit board having a first surface on which the image sensor is mounted; and
an external circuit connection portion configured to connect to a connection edge at a side edge of the sensor circuit board and extend outside the housing to be connectable to an external circuit,
wherein the connection edge of the sensor circuit board is disposed between imaginary surfaces extending from the opposing outer surfaces,
wherein the external circuit connection portion further includes a flexible circuit board having one end connected to the connection edge of the sensor circuit board, and
wherein the flexible circuit board is bent and disposed between the imaginary surfaces.

18. The camera module of claim 17, wherein the connection edge of the sensor circuit board and the flexible circuit board are disposed not protrude beyond the imaginary surfaces.

\* \* \* \* \*